(No Model.)

G. H. GRIFFITHS.
TREADLE MOTION FOR VELOCIPEDES.

No. 314,013. Patented Mar. 17, 1885.

WITNESSES:

INVENTOR:
G. H. Griffiths

BY
ATTORNEYS.

UNITED STATES PATENT OFFICE.

GEORGE H. GRIFFITHS, OF NEW ROCHELLE, NEW YORK.

TREADLE-MOTION FOR VELOCIPEDES.

SPECIFICATION forming part of Letters Patent No. 314,013, dated March 17, 1885.

Application filed September 2, 1884. (No model.)

*To all whom it may concern:*

Be it known that I, GEORGE H. GRIFFITHS, of New Rochelle, in the county of Westchester and State of New York, have invented a new and Improved Treadle-Motion, of which the following is a full, clear, and exact description.

This invention consists, principally, of a treadle-motion wherein links and springs are used for rendering the foot movement more natural and easy, and for avoiding the dead-center.

The invention also consists of the construction, arrangement, and combination of parts, all as hereinafter described and claimed.

Reference is to be had to the accompanying drawings, forming part of this specification, in which similar letters of reference indicate corresponding parts in both the figures.

Figure 1:
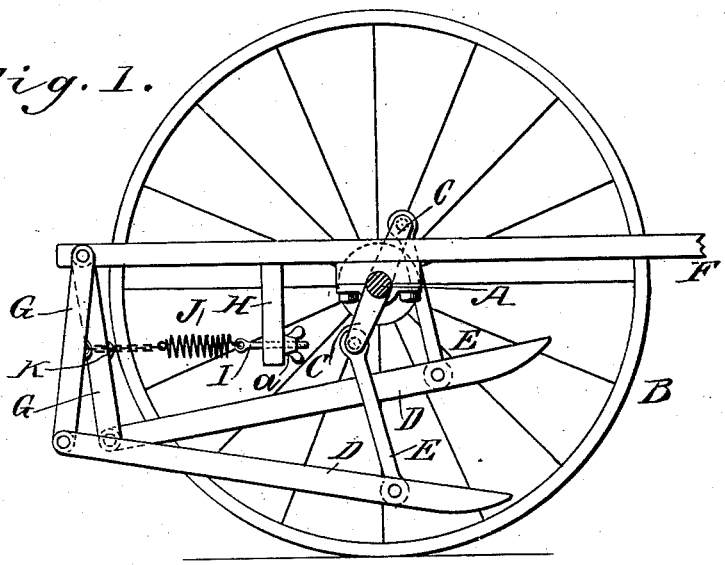
Figure 2:
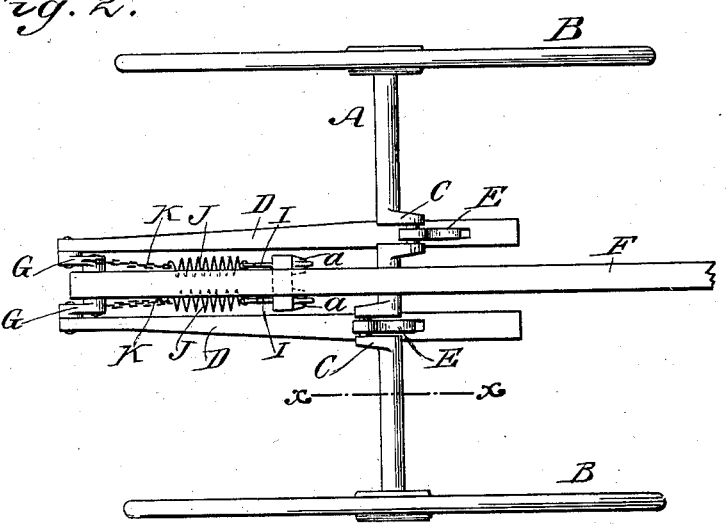

Figure 1 is a sectional elevation, on the line $xx$ in Fig. 2, of my new treadle-motion applied to a tricycle, the rear wheels, axle, and reach of the tricycle only being shown; and Fig. 2 is a plan view of the same.

The axle A, to which the wheels B B are secured, is formed with the opposite cranks C C. To these the treadles D D are attached by the links E E. The rear ends of the treadles D D are attached to the reach F above by the links G G. Between the axle A and the points of the connection of the links G G with the reach F the said reach is provided with the depending arm H, which is provided with the adjustable eyebolt I. To these bolts are attached the inner ends of the coiled springs J J, to the opposite ends of which the links G G are connected by the short chains K K, so that the backward movement of the links G G will be against the tension of the springs J, which will react as soon as pressure is removed from the treadles D, and bring the treadles and the links forward at the time the cranks C raise the treadles. In this manner the treadles are given a walking movement—that is, a downward and backward and an upward and forward movement—which is much more natural and easier to the user than the ordinary straight up-and-down treadle, and, besides, in this manner the links E follow the cranks C, so that there is no difficulty in passing the dead-center.

By turning the nuts $a$ on the bolts I, the tension of the springs J J may be increased or diminished, as desired.

It will be understood that I do not confine my invention to tricycles, as it is applicable to various kinds of foot-power machinery.

Having thus described my invention, I claim as new and desire to secure by Letters Patent—

1. The combination, with the crank axle or shaft A, treadles D, and links E, of the links G, arm H, and springs J, arranged to operate substantially as and for the purposes set forth.

2. The reach F, provided with the arm H, in combination with the crank axle or shaft A, treadle D, links E G, and the springs J, the same being attached to the links G and arm H, and made adjustable, substantially as described.

3. The combination, with a cranked axle and treadles and their links or connections for operating said axle, of links supporting the inner ends of said treadles, and of springs connected to these supporting-links and to a fixed support, substantially as shown and described, and for the purpose set forth.

GEORGE H. GRIFFITHS.

Witnesses:
H. A. WEST,
C. SEDGWICK.